(12) United States Patent
Corallo (10) Patent No.: US 11,377,262 B2
(45) Date of Patent: Jul. 5, 2022

(54) CUSTOMIZABLE INTEGRATION SYSTEM FOR PALLET

(71) Applicant: Hamilton Sundstrand Corporation, Charlotte, NC (US)

(72) Inventor: Roger Corallo, West Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 236 days.

(21) Appl. No.: 16/186,079

(22) Filed: Nov. 9, 2018

(65) Prior Publication Data
US 2020/0148422 A1    May 14, 2020

(51) Int. Cl.
*B64G 1/22* (2006.01)
*B65D 90/00* (2006.01)
(Continued)

(52) U.S. Cl.
CPC ............. *B65D 25/22* (2013.01); *B65D 19/06* (2013.01); *B64G 1/22* (2013.01); *B65D 19/38* (2013.01); *B65D 25/005* (2013.01); *B65D 25/42* (2013.01); *B65D 90/0026* (2013.01); *B65D 90/0033* (2013.01); *B65D 90/18* (2013.01)

(58) Field of Classification Search
CPC ........... B60P 7/13; B60P 7/132; B60P 7/0807; B60P 7/0823; B62B 1/18; B62B 3/08; B62B 2203/07; B62B 2203/70; B62B 2203/071; B64C 1/20; B64C 1/22; B64D 9/00; B64D 9/003; B64D 2009/006; B64G 1/22; B64G 1/641; B64G 2001/1092; B64G 1/646; B64G 1/66; B64G 1/64; B65D 25/22; B65D 25/005; B65D 25/42; B65D 19/06; B65D 19/38; B65D 88/12; B65D 90/0033; B65D 90/0006; B65D 90/0026; B65D 2519/0098; B65D 90/12; B65D 90/125; B65D 88/14; B65D 2519/00547; B65D 2519/00343; B65D 2519/00348; B65G 2201/0235; B65G 7/00; B65G 7/08; B66C 1/663; Y10T 24/4773; Y10T 24/28; Y10T 24/47; Y10T 24/2174; B63B 25/24; E04G 21/147
USPC ....... 52/125.2, 261, 280, 239, 648; 206/598, 206/386; 211/13.1, 189; 220/1.5, 562; 224/401; 244/137.1, 118.1, 118.2, 158.1; 280/79.11; 294/215, 82.1; 296/3;
(Continued)

(56) References Cited

U.S. PATENT DOCUMENTS

1,937,668 A * 12/1933 Pine .......................... B62B 3/08
   248/129
2,903,219 A * 9/1959 Ingham, Jr. ............... B62B 3/08
   248/137
(Continued)

*Primary Examiner* — Gideon R Weinerth
(74) *Attorney, Agent, or Firm* — Cantor Colburn LLP (57) ABSTRACT

A pallet assembly is provided and includes one of a bushing, a utility panel assembly and tooling features. The bushing is securably insertable into bushing openings defined in bottom and top pallet assembly panels and pallet assembly sidewalls. The bushing is selected from a group including multiple bushings having bores of various sizes and one or more apertures of varying sizes that are communicative with the bores. The utility panel assembly is supportively disposable on the bottom pallet assembly panel and includes a utility panel having multiple connectors. The tooling features supportively connect the pallet assembly sidewalls to a transport cart.

17 Claims, 4 Drawing Sheets

(51) Int. Cl.
  *B65D 88/12*  (2006.01)
  *B65D 90/18*  (2006.01)
  *B65D 25/22*  (2006.01)
  *B65D 19/06*  (2006.01)
  *B65D 25/42*  (2006.01)
  *B65D 25/00*  (2006.01)
  *B65D 19/38*  (2006.01)

(58) Field of Classification Search
  USPC ...... 410/72, 81, 82; 414/286, 802, 590, 619, 414/620, 621; 24/590.1, 109; 403/171
  See application file for complete search history.

(56) References Cited

U.S. PATENT DOCUMENTS

| | | | | |
|---|---|---|---|---|
| 3,081,120 | A * | 3/1963 | Heinmiller | B65D 88/121 294/68.3 |
| 3,189,363 | A * | 6/1965 | Pierrat | B60P 7/13 267/273 |
| 3,404,444 | A * | 10/1968 | Isbrandtsen | B65D 90/0026 29/897 |
| 4,049,149 | A * | 9/1977 | Durenec | B60P 7/132 410/82 |
| 4,050,580 | A * | 9/1977 | Wilson | B01F 9/0018 206/511 |
| 4,452,555 | A * | 6/1984 | Calabro | B60P 1/6445 280/43.23 |
| 4,610,561 | A * | 9/1986 | Cecchellero | E04B 1/1912 403/171 |
| 4,747,504 | A * | 5/1988 | Wiseman | B65D 88/14 220/1.5 |
| 4,819,820 | A * | 4/1989 | Weiner | B65D 88/022 220/1.5 |
| 4,872,625 | A * | 10/1989 | Filley | B64G 1/12 244/159.4 |
| 5,050,821 | A * | 9/1991 | Kerstein | B64G 1/22 244/173.1 |
| 5,109,998 | A * | 5/1992 | Bretschneider | B65D 90/021 220/1.5 |
| 5,511,908 | A * | 4/1996 | Van Valkenburgh | B65F 1/1426 206/386 |
| 5,613,653 | A * | 3/1997 | Bombled | B64G 1/641 244/173.1 |
| 5,791,600 | A * | 8/1998 | Thompson | B64G 1/646 244/159.4 |
| 5,791,856 | A * | 8/1998 | Kosonen | B65D 90/143 414/458 |
| 5,848,766 | A * | 12/1998 | Thompson | B64G 1/60 244/173.1 |
| D407,298 | S * | 3/1999 | Hemphill | D8/367 |
| D408,267 | S * | 4/1999 | Egigian | D8/354 |
| 5,953,928 | A * | 9/1999 | Saia, III | F25D 3/105 62/239 |
| 6,148,740 | A * | 11/2000 | Jackel | B65D 19/44 108/51.11 |
| 6,220,468 | B1 * | 4/2001 | Lee | B65D 88/121 220/1.5 |
| 6,237,795 | B1 * | 5/2001 | Buckley | B64G 1/641 206/521 |
| 6,267,253 | B1 * | 7/2001 | Jellicorse | A47F 5/0018 211/13.1 |
| 6,270,283 | B1 * | 8/2001 | Turati | H02B 1/01 403/219 |
| 6,290,181 | B1 * | 9/2001 | Gadd | B64G 1/12 244/118.5 |
| 6,296,957 | B1 * | 10/2001 | Graage | H01M 8/04225 429/425 |
| 6,299,268 | B1 * | 10/2001 | Carle | H02B 1/01 312/265.1 |
| 6,318,672 | B1 * | 11/2001 | Traylor | B64D 11/00 244/118.5 |
| 6,330,152 | B1 * | 12/2001 | Vos | H05K 7/206 165/104.33 |
| 6,729,098 | B1 * | 5/2004 | Brennan, Jr. | B60P 7/132 52/700 |
| 6,788,535 | B2 * | 9/2004 | Dodgen | H05K 7/206 165/104.33 |
| 6,863,190 | B2 * | 3/2005 | Rashford | B65D 90/08 220/1.5 |
| 6,905,097 | B2 * | 6/2005 | Blackwell-Thompson | B64G 1/14 244/173.1 |
| D515,910 | S * | 2/2006 | Gates | B60R 9/06 D8/354 |
| 7,059,488 | B2 * | 6/2006 | Myers | B65D 90/0026 220/1.5 |
| D549,556 | S * | 8/2007 | Christie | D8/354 |
| 7,316,461 | B2 * | 1/2008 | Wyatt | H02B 1/301 312/265.4 |
| 8,091,970 | B2 * | 1/2012 | Francisquini | H02B 1/301 312/265.1 |
| 8,162,542 | B2 * | 4/2012 | Harman | B65D 88/745 374/208 |
| 8,770,422 | B2 * | 7/2014 | Cantin | B65D 19/44 206/595 |
| 8,944,533 | B2 * | 2/2015 | Hofmann | H02B 1/01 312/265.1 |
| 9,016,626 | B2 * | 4/2015 | Schliwa | B61D 37/00 244/118.5 |
| 9,227,645 | B2 * | 1/2016 | Franco | B62B 5/087 |
| 9,678,488 | B1 | 6/2017 | Dhondt et al. | |
| 9,848,697 | B2 * | 12/2017 | Eichelberger | A47B 47/028 |
| 10,765,035 | B2 * | 9/2020 | Cacho Alonso | H05K 5/069 |
| 2003/0141305 | A1 * | 7/2003 | Rashford | B64G 1/22 220/562 |
| 2005/0036871 | A1 * | 2/2005 | Jackson | B62B 3/104 414/619 |
| 2006/0058023 | A1 * | 3/2006 | White | B64G 7/00 455/427 |
| 2006/0119239 | A1 * | 6/2006 | Werwick | A47B 47/0008 312/334.29 |
| 2006/0192057 | A1 * | 8/2006 | Smith | B64G 1/641 244/173.1 |
| 2006/0261112 | A1 * | 11/2006 | Gates | B60R 11/00 224/558 |
| 2009/0089981 | A1 * | 4/2009 | Davidson | B65D 90/0026 24/287 |
| 2009/0178821 | A1 * | 7/2009 | Zavidniak | H05K 7/183 174/51 |
| 2009/0212047 | A1 * | 8/2009 | Harman | B65D 90/0033 220/1.5 |
| 2011/0210227 | A1 * | 9/2011 | Burg | B60P 7/0807 248/499 |
| 2011/0309046 | A1 * | 12/2011 | Lee | A47B 47/03 211/182 |
| 2012/0012543 | A1 * | 1/2012 | Fan | H05K 7/1488 211/26 |
| 2012/0153080 | A1 * | 6/2012 | Duggar | B64D 11/04 244/118.1 |
| 2013/0077279 | A1 * | 3/2013 | Tomasi | B64C 1/20 361/807 |
| 2013/0342091 | A1 * | 12/2013 | Walker | H05K 5/02 312/265.5 |
| 2014/0238979 | A1 * | 8/2014 | Chen | B65D 90/18 220/1.5 |
| 2016/0048612 | A1 | 2/2016 | Simon | |
| 2016/0288930 | A1 * | 10/2016 | Aridon | B64G 1/10 |
| 2017/0050657 | A1 * | 2/2017 | Roach | B62B 3/04 |
| 2017/0096240 | A1 * | 4/2017 | Cook | B64G 1/646 |
| 2017/0108841 | A1 | 4/2017 | Nicks | |
| 2017/0355297 | A1 * | 12/2017 | Chimenti | B60P 7/0807 |
| 2018/0194267 | A1 * | 7/2018 | Helou, Jr. | B65D 90/0006 |
| 2018/0194548 | A1 * | 7/2018 | Helou, Jr. | B64C 1/064 |
| 2019/0092498 | A1 * | 3/2019 | Siquier | G06F 30/20 |
| 2020/0055668 | A1 * | 2/2020 | Strong | B65D 90/02 |

(56) References Cited

U.S. PATENT DOCUMENTS

2020/0148422 A1* 5/2020 Corallo ................ B65D 25/22
2021/0309414 A1* 10/2021 Rashford .............. B65D 25/08

* cited by examiner

CUSTOMIZABLE INTEGRATION SYSTEM FOR PALLET

STATEMENT OF FEDERAL SUPPORT

This invention was made with government support under contract number NNH15CN27C awarded by the NASA. The government has certain rights in the invention.

BACKGROUND

The following description relates to pallet assemblies and, more particularly, to a pallet storage assembly with a customizable integration system.

A pallet assembly is the storage unit for the environmental control and life support equipment presently destined for NASA's next space technologies for exploration partnerships (NEXTSTEP) space program. The pallet assembly is typically installable in a variety of space vehicles but, since each space vehicle can have unique utility and structural integration requirements, the pallet assembly often needs to be modified and customized on site. This is often an expensive and time-consuming process.

BRIEF DESCRIPTION

According to one aspect of the disclosure, a pallet assembly is provided and includes one of a bushing, a utility panel assembly and tooling features. The bushing is securably insertible into bushing openings defined in bottom and top pallet assembly panels and pallet assembly sidewalls. The bushing is selected from a group including multiple bushings having bores of various sizes and one or more apertures of varying sizes that are communicative with the bores. The utility panel assembly is supportively disposable on the bottom pallet assembly panel and includes a utility panel having multiple connectors. The tooling features supportively connect the pallet assembly sidewalls to a transport cart.

In accordance with additional or alternative embodiments, the multiple bushings include a first bushing and a second bushing. The first bushing includes a base, which is configured to sit flush or nearly flush with the bottom and top pallet assembly panels and the pallet assembly sidewalls, and a center body including an axial end and sidewalls extending from the base to the axial end. The base and the sidewalls define a bore and the axial end defines one or more apertures that each have substantially smaller diameters than the bore. The second bushing includes a base, which is configured to sit flush or nearly flush with the bottom and top pallet assembly panels and the pallet assembly sidewalls, and a center body including an axial end and sidewalls extending from the base to the axial end. The base and the sidewalls define a bore and the axial end defines an aperture that has substantially similar diameter as the bore.

In accordance with additional or alternative embodiments, one or more of lifting hoists and mounting feet are respectively compatible with one or more of the multiple bushings.

In accordance with additional or alternative embodiments, the utility panel assembly further includes a base attachable to the bottom pallet assembly panel, a frame defining an access opening and a body supportive of the utility panel and the frame.

In accordance with additional or alternative embodiments, the multiple connectors include one or more of fluid, gas and electrical connectors.

In accordance with additional or alternative embodiments, the tooling features supportively connect opposite pallet assembly sidewalls to the transport cart.

In accordance with additional or alternative embodiments, the tooling features permit pallet assembly rotation about a rotational axis extending through the tooling features.

According to another aspect of the disclosure, a pallet assembly is provided and includes bottom and top panels and sidewalls configured to support the top panel above the bottom panel. The pallet assembly further includes one of a bushing, a utility panel assembly and tooling features. The bushing is securably insertible into bushing openings defined in the bottom and top panels and the sidewalls. The bushing is selected from a group including multiple bushings having bores of various sizes and one or more apertures of varying sizes that are communicative with the bores. The utility panel assembly is supportively disposable on the bottom panel and includes a utility panel having multiple connectors. The tooling features supportively connect the sidewalls to a transport cart.

In accordance with additional or alternative embodiments, the multiple bushings include a first bushing and a second bushing. The first bushing includes a base, which is configured to sit flush or nearly flush with the bottom and top panels and the sidewalls, and a center body including an axial end and sidewalls extending from the base to the axial end. The base and the sidewalls define a bore and the axial end defines one or more apertures that each have substantially smaller diameters than the bore. The second bushing includes a base, which is configured to sit flush or nearly flush with the bottom and top panels and the sidewalls, and a center body including an axial end and sidewalls extending from the base to the axial end. The base and the sidewalls define a bore and the axial end defines an aperture that has substantially similar diameter as the bore.

In accordance with additional or alternative embodiments, one or more of lifting hoists and mounting feet are respectively compatible with one or more of the multiple bushings.

In accordance with additional or alternative embodiments, the utility panel assembly further includes a base attachable to the bottom panel, a frame defining an access opening and a body supportive of the utility panel and the frame.

In accordance with additional or alternative embodiments, the multiple connectors include one or more of fluid, gas and electrical connectors.

In accordance with additional or alternative embodiments, the tooling features supportively connect opposite sidewalls to the transport cart.

In accordance with additional or alternative embodiments, the tooling features permit pallet assembly rotation about a rotational axis extending through the tooling features.

According to another aspect of the disclosure, a pallet assembly is provided and includes bottom and top panels, sidewalls configured to support the top panel above the bottom panel and one or more of a bushing, a utility panel assembly and tooling features. The bushing is securably insertible into bushing openings defined in the bottom and top panels and the sidewalls. The bushing is selected from a group including multiple bushings having bores of various sizes and one or more apertures of varying sizes that are communicative with the bores. The utility panel assembly is supportively disposable on the bottom panel and includes a utility panel having one or more fluid, gas or electrical connectors. The tooling features supportively connect the sidewalls to a transport cart.

In accordance with additional or alternative embodiments, the multiple bushings include a first bushing and a second bushing. The first bushing includes a base, which is configured to sit flush or nearly flush with the bottom and top panels and the sidewalls, and a center body including an axial end and sidewalls extending from the base to the axial end. The base and the sidewalls define a bore and the axial end defines one or more apertures that each have substantially smaller diameters than the bore. The second bushing includes a base, which is configured to sit flush or nearly flush with the bottom and top panels and the sidewalls, and a center body including an axial end and sidewalls extending from the base to the axial end. The base and the sidewalls define a bore and the axial end defines an aperture that has substantially similar diameter as the bore.

In accordance with additional or alternative embodiments, one or more of lifting hoists and mounting feet are respectively compatible with one or more of the multiple bushings.

In accordance with additional or alternative embodiments, the utility panel assembly further includes a base attachable to the bottom panel, a frame defining an access opening and a body supportive of the utility panel and the frame.

In accordance with additional or alternative embodiments, the tooling features supportively connect opposite sidewalls to the transport cart.

In accordance with additional or alternative embodiments, the tooling features permit pallet assembly rotation about a rotational axis extending through the tooling features.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a pallet assembly is provided with a customizable integration options at structural vehicle integration points, a customizable utility (fluid, gas, electrical) integration panel and a customizable routing (fluid, gas, electrical) approach.

Figure 1:
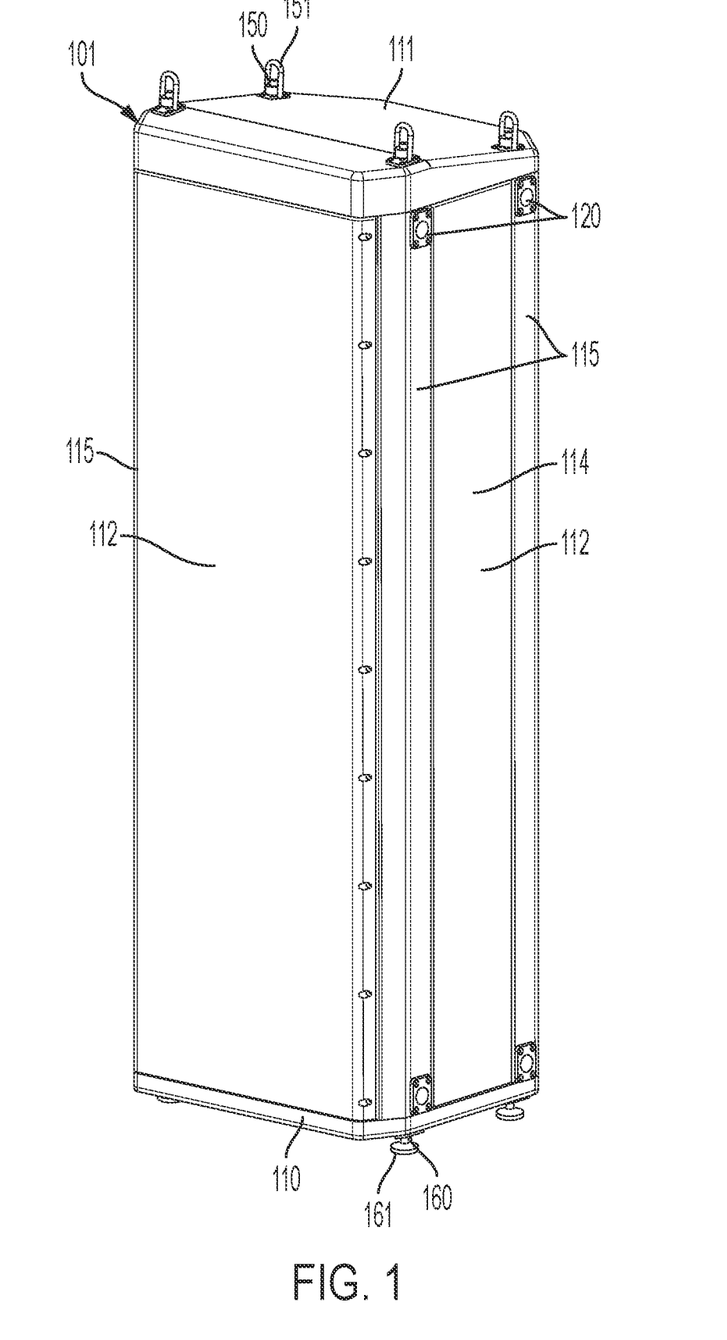
FIG. 1 is a perspective view of a pallet assembly in accordance with embodiments.
Figure 2:
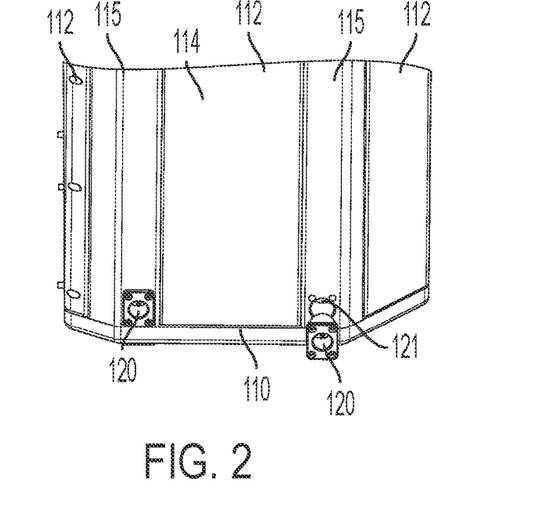
FIG. 2 is a perspective view of bushings inserted into the pallet assembly of FIG. 1.
Figure 3:
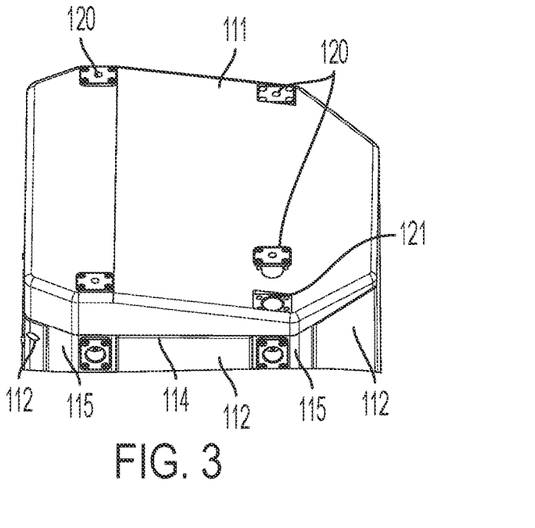
FIG. 3 is a perspective view of bushings inserted into the pallet assembly of FIG. 1

With reference to FIGS. 1-8, a pallet assembly 101 is provided for use in various types of spacecraft or other vehicles. As shown in FIG. 1, the pallet assembly 101 includes a bottom pallet assembly panel 110, a top pallet assembly panel 111 and sidewalls 112 that are configured to support the top pallet assembly panel 111 above the bottom pallet assembly panel 110 whereby the bottom pallet assembly panel 110, the top pallet assembly panel 111 and the sidewalls 112 cooperatively define an interior 113 (see FIG. 6). Each sidewall 112 includes a sidewall pallet assembly panel 114 and sidewall rails 115 that support opposite edges of the sidewall pallet assembly panel 114. The pallet assembly 101 further includes one or more of a bushing 120 (see FIG. 1 and FIGS. 2-5), a utility panel assembly 130 (see FIG. 6) and tooling features 140 (see FIGS. 7 and 8).

The bushing 120 is securably insertible into bushing openings 121 (see FIGS. 2 and 3) that are defined in the bottom pallet assembly panel 110, the top pallet assembly panel 111 and the sidewalls 112. The bushing 120 can be provided as multiple bushings 120 with each of the multiple bushings 120 being selected from a group that includes multiple types of bushings 120. The bushings 120 of each type have bores 122 of various sizes and one or more apertures 123 of varying sizes that are communicative with the bores 122.

Figure 4:
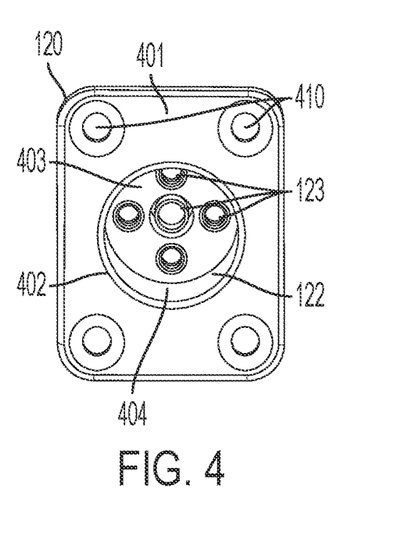
FIG. 4 is a perspective view of a type of a bushing of FIGS. 2 and 3 in accordance with embodiments.

As shown in FIG. 4, a first type of bushing 120 is characterized in that the bushing 120 includes a base 401, which is configured to sit flush or nearly flush with the bottom pallet assembly panel 110, the top pallet assembly panel 111 and the sidewalls 112, a center body 402 and outer apertures 410 defined through the base 401 and arrayed around the center body 402. The center body 402 includes an axial end 403 and sidewalls 404. The sidewalls 404 extend from the base 401 to the axial end 403. The base 401 and the sidewalls 404 are formed to cooperatively define the bore 122 and the axial end 403 is formed to define multiple apertures 123. Each of the multiple apertures 123 have substantially smaller diameters than the bore 122.

Figure 5:
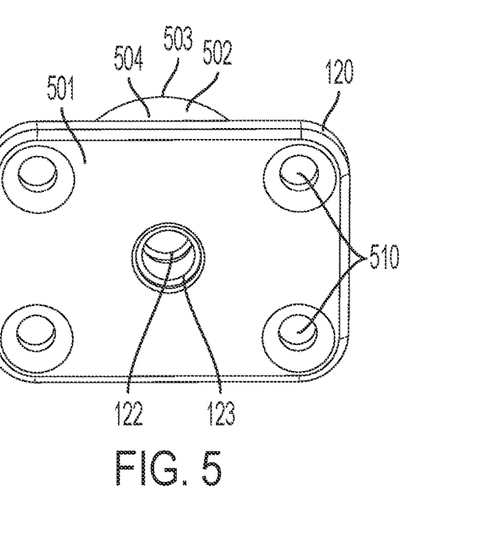
FIG. 5 is a perspective view of a type of a bushing of FIGS. 2 and 3 in accordance with embodiments.

As shown in FIG. 5, a second type of bushing 120 is characterized in that the bushing 120 includes a base 501, which is configured to sit flush or nearly flush with the bottom pallet assembly panel 110, the top pallet assembly panel 111 and the sidewalls 112, a center body 502 and outer apertures 510 defined through the base 501 and arrayed around the center body 502. The center body 502 includes an axial end 503 and sidewalls 504. The sidewalls 504 extend from the base 501 to the axial end 503. The base 501 and the sidewalls 504 are formed to cooperatively define the bore 122 and the axial end 503 is formed to define a single apertures 123. The single aperture 123 has a substantially similar diameter as the bore 122.

As shown in FIG. 1, the pallet assembly 101 may further includes one or more of lifting hoists 150 and/or one or more of mounting feet 160. Each of the one or more of the lifting hoists 150 includes a curved lug element 151 and is respectively compatible with and insertible into one or more of the multiple bushings 120 that is in turn securably inserted into the top pallet assembly panel 111 and the sidewalls 112. Each of the one or more of the mounting feet 160 includes an articulatable padded/unpadded foot element 161 and is respectively compatible with and insertible into one or more of the multiple bushings 120 that is in turn securably inserted into the bottom pallet assembly panel 110.

Figure 6:
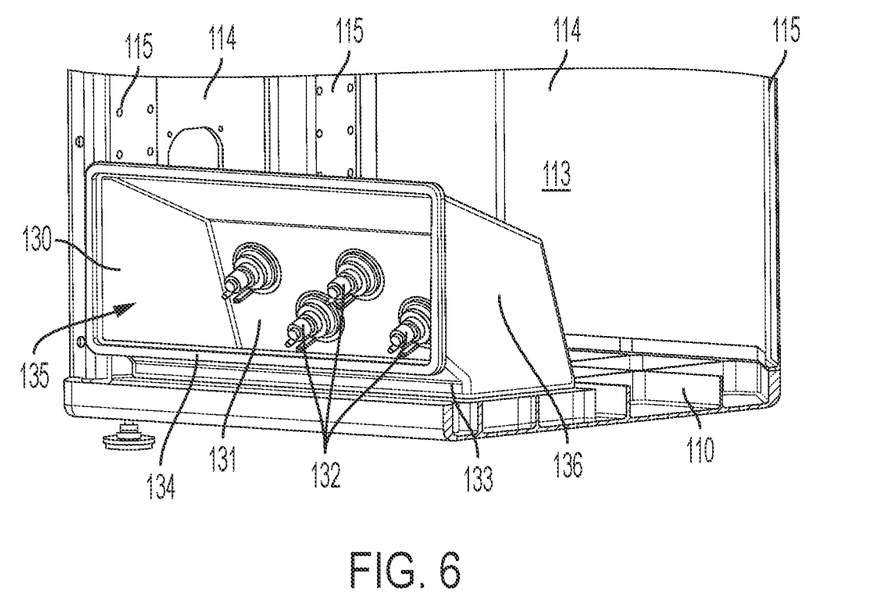
FIG. 6 is a perspective view of a utility panel assembly of the pallet assembly of FIG. 1.

As shown in FIG. 6, the utility panel assembly 130 is supportively disposable on the bottom pallet assembly panel 110. The utility panel assembly 130 includes a utility panel 131 having one or multiple fluid, gas or electrical connectors 132, a base 133 that is attachable to the bottom pallet assembly panel 110, a frame 134 that is formed to define an access opening 135, which is accessible through a front facing sidewall 112 or exposed to an exterior of the pallet assembly 101, a body 136 that is supportive of the utility panel 131 at an interior side thereof and the frame 134 at an exterior side thereof.

Figure 7:
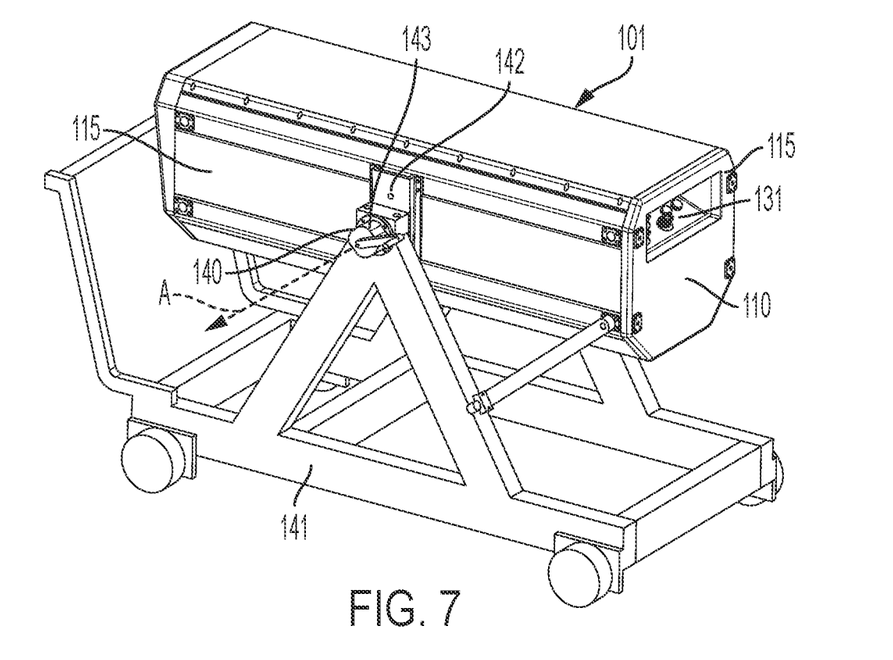
FIG. 7 is a perspective view of tooling features of the panel assembly of FIG. 1.
Figure 8:
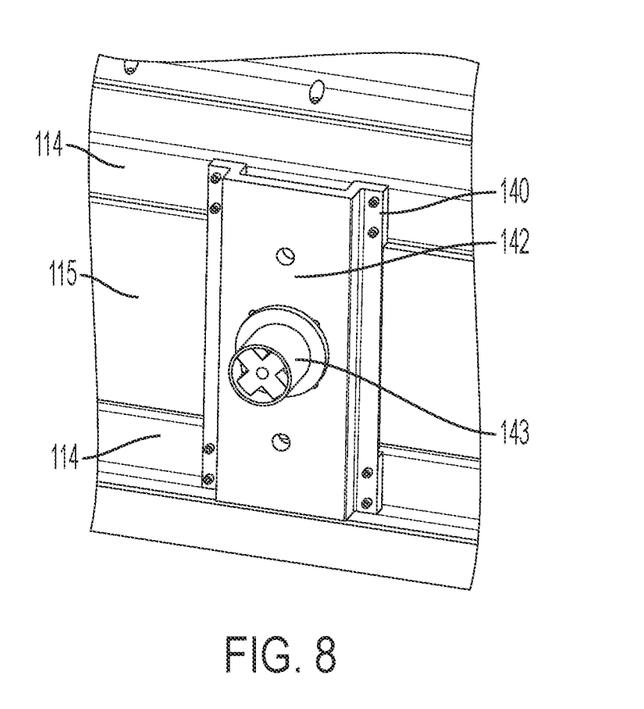
FIG. 8 is an enlarged view of the tooling features of FIG. 7.

As shown in FIGS. 7 and 8, the tooling features 140 are configured to supportively connect opposite ones of the sidewalls 112 to a transport cart 141 so that the pallet assembly 101 as a whole can be transported during ground-based operations. In accordance with embodiments, each of the tooling features 140 includes a plate element 142, which is attachable to the corresponding sidewall rails 115, and a rotational element 143. The rotational elements 143 extend outwardly from the plate elements 142 and define a rotational axis A. The rotational elements 143 are configured to be seated on the transport cart 141 and are rotatable about the rotational axis A to thereby drive pallet assembly rotation about the rotational axis A.

Technical effects and benefits of the features described herein are the provision of a pallet assembly which can be integrated into a variety of space vehicles.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A pallet assembly, comprising:
   a bottom pallet assembly panel;
   a top pallet assembly panel;
   pallet assembly sidewalls;
   rails that support opposite edges of at least the pallet assembly sidewalls with the bottom pallet assembly panel, the top pallet assembly panel and the pallet assembly sidewalls defining an interior;
   multiple bushings having bores of various sizes and one or more apertures of varying sizes that are communicative with the bores, wherein one or more individual bushings may be selected from the group of multiple bushings and each individual bushing is securably insertable into bushing openings defined in the bottom pallet assembly panel, in the top pallet assembly panel and in each of the pallet assembly sidewalls; and
   a utility panel assembly, which is supportively disposable on the bottom pallet assembly panel and which comprises a utility panel having multiple connectors,
   wherein the multiple bushings comprise:
   a first bushing comprising a base, which is configured to sit flush or nearly flush with each of the bottom and top pallet assembly panels and the pallet assembly sidewalls, and a center body comprising an axial end and sidewalls extending from the base to the axial end, the base and the sidewalls defining a bore and the axial end defining multiple apertures that each have substantially smaller diameters than the bore; and
   a second bushing comprising a base, which is configured to sit flush or nearly flush with each of the bottom and top pallet assembly panels and the pallet assembly sidewalls, and a center body comprising an axial end and sidewalls extending from the base to the axial end, the base and the sidewalls defining a bore and the axial end defining a single aperture that has substantially similar diameter as the bore.

2. The pallet assembly according to claim 1, further comprising:
   lifting hoists, each of which comprises a curved lug element respectively compatible with and insertable into one or more of the multiple bushings; and
   mounting feet, each comprising an articulated padded foot element, which are respectively compatible with one or more of the multiple bushings.

3. The pallet assembly according to claim 1, wherein the utility panel assembly further comprises:
   a base attachable to the bottom pallet assembly panel;
   a frame defining an access opening; and
   a body supportive of the utility panel and the frame.

4. The pallet assembly according to claim 1, wherein the multiple connectors comprise one or more of fluid, gas and electrical connectors.

5. The pallet assembly according to claim 1, further comprising a transport cart and tooling features for supportively connecting the pallet assembly sidewalls to the transport cart, wherein the tooling features supportively connect opposite pallet assembly sidewalls to the transport cart.

6. The pallet assembly according to claim 5, wherein the tooling features permit pallet assembly rotation about a rotational axis extending through the tooling features and each comprise:
   plate elements attachable to the sidewalls; and
   rotational elements that extend outwardly from the plate elements to define the rotational axis A.

7. A pallet assembly, comprising:
   bottom and top panels;
   sidewalls configured to support the top panel above the bottom panel;
   rails that support opposite edges of each of the sidewalls, with the bottom and top panels and the sidewalls defining an interior;
   multiple bushings having bores of various sizes and one or more apertures of varying sizes that are communicative with the bores, wherein one or more individual bushings may be selected from the group of multiple bushings and each individual bushing is securably insertable into bushing openings defined in the bottom and top panels and in each of the sidewalls; and
   a utility panel assembly, which is supportively disposable on the bottom panel and which comprises a utility panel having multiple connectors,
   wherein the multiple bushings comprise:
   a first bushing comprising a base, which is configured to sit flush or nearly flush with each of the bottom and top panels and the sidewalls, and a center body comprising an axial end and sidewalls extending from the base to the axial end, the base and the sidewalls defining a bore and the axial end defining multiple apertures that each have substantially smaller diameters than the bore; and
   a second bushing comprising a base, which is configured to sit flush or nearly flush with each of the bottom and top panels and the sidewalls, and a center body comprising an axial end and sidewalls extending from the base to the axial end, the base and the sidewalls defining a bore and the axial end defining a single aperture that has substantially similar diameter as the bore.

8. The pallet assembly according to claim 7, further comprising:
- lifting hoists, each of which comprises a curved lug element respectively compatible with and insertable into one or more of the multiple bushings; and
- mounting feet, each comprising an articulated padded foot element, which are respectively compatible with one or more of the multiple bushings.

9. The pallet assembly according to claim 7, wherein the utility panel assembly further comprises:
- a base attachable to the bottom panel;
- a frame defining an access opening; and
- a body supportive of the utility panel and the frame.

10. The pallet assembly according to claim 7, wherein the multiple connectors comprise one or more of fluid, gas and electrical connectors.

11. The pallet assembly according to claim 7, further comprising a transport cart and tooling features for supportively connecting the pallet assembly sidewalls to the transport cart, wherein the tooling features supportively connect opposite sidewalls to the transport cart.

12. The pallet assembly according to claim 11, wherein the tooling features permit pallet assembly rotation about a rotational axis extending through the tooling features and each comprise:
- plate elements attachable to the sidewalls; and
- rotational elements that extend outwardly from the plate elements to define the rotational axis A.

13. A pallet assembly, comprising:
- bottom and top panels;
- sidewalls configured to support the top panel above the bottom panel;
- rails that support opposite edges of each of the sidewalls, with the bottom and top panels and the sidewalls defining an interior;
- multiple bushings having bores of various sizes and one or more apertures of varying sizes that are communicative with the bores, wherein one or more individual bushings may be selected from the group of multiple bushings and each individual bushing is securably insertable into bushing openings defined in the bottom and top panels and in each of the sidewalls; and
- a utility panel assembly, which is supportively disposable on the bottom panel and which comprises a utility panel having one or more fluid, gas or electrical connectors, wherein the multiple bushings comprise:
- a first bushing comprising a base, which is configured to sit flush or nearly flush with each of the bottom and top panels and the sidewalls, and a center body comprising an axial end and sidewalls extending from the base to the axial end, the base and the sidewalls defining a bore and the axial end defining multiple apertures that each have substantially smaller diameters than the bore; and
- a second bushing comprising a base, which is configured to sit flush or nearly flush with each of the bottom and top panels and the sidewalls, and a center body comprising an axial end and sidewalls extending from the base to the axial end, the base and the sidewalls defining a bore and the axial end defining a single aperture that has substantially similar diameter as the bore.

14. The pallet assembly according to claim 13, further comprising:
- lifting hoists, each of which comprises a curved lug element respectively compatible with and insertable into one or more of the multiple bushings; and
- mounting feet, each comprising an articulated padded foot element, which are respectively compatible with one or more of the multiple bushings.

15. The pallet assembly according to claim 13, wherein the utility panel assembly further comprises:
- a base attachable to the bottom panel;
- a frame defining an access opening; and
- a body supportive of the utility panel and the frame.

16. The pallet assembly according to claim 13, further comprising a transport cart and tooling features for supportively connecting the sidewalls to the transport cart, wherein the tooling features supportively connect opposite sidewalls to the transport cart.

17. The pallet assembly according to claim 16, wherein the tooling features permit pallet assembly rotation about a rotational axis extending through the tooling features and each comprises:
- plate elements attachable to the sidewalls; and
- rotational elements that extend outwardly from the plate elements to define the rotational axis A.

* * * * *